United States Patent [19]

Szejtli et al.

[11] Patent Number: 4,529,608
[45] Date of Patent: Jul. 16, 1985

[54] HONEY POWDER PRESERVING ITS NATURAL AROMA COMPONENTS

[75] Inventors: József Szejtli; Márta Tardy née Lengyel, both of Budapest, Hungary

[73] Assignee: Chinoin Gyogyszer es Vegyeszeti Termekek Gyara Rt, Budapest, Hungary

[21] Appl. No.: 549,205

[22] Filed: Nov. 4, 1983

[30] Foreign Application Priority Data

Nov. 8, 1982 [HU] Hungary .................. 3577/82

[51] Int. Cl.$^3$ .............................. A23L 1/08
[52] U.S. Cl. .................... 426/96; 426/103; 426/658; 426/465; 426/473; 426/650; 426/654; 426/443; 426/444; 127/29; 127/33
[58] Field of Search ............ 426/96, 103, 658, 650, 426/443, 465, 444, 473; 127/29, 33

[56] References Cited

U.S. PATENT DOCUMENTS

| | | | |
|---|---|---|---|
| 2,693,420 | 11/1954 | Straub | 426/658 |
| 2,970,056 | 1/1961 | Benson | 426/658 |
| 3,483,032 | 12/1969 | Stern et al. | 426/658 |

FOREIGN PATENT DOCUMENTS

| | | | |
|---|---|---|---|
| 549442 | 11/1957 | Canada | 426/658 |
| 21725 | 2/1980 | Japan | 426/658 |
| 20583 | 4/1983 | Japan | 426/658 |

*Primary Examiner*—Jeanette Hunter
*Attorney, Agent, or Firm*—Karl F. Ross; Herbert Dubno

[57] ABSTRACT

A process for the preparation of honey powder preserving its natural aroma substances comprises (a) kneading 1 part by weight of honey, 0.8 part by weight of starch, pre-hydrolyzed starch or flour and 0.1–0.3 part by weight of cyclodextrin to yield a homogeneous mixture, subjecting the mixture thus obtained to thermal treatment at 100° C. for 20 minutes, disintegrating the hot product obtained after thermal treatment, drying the product at a temperature of 50°–55° C., for 10–50 hours, adding 0.01–1.0% by weight of hydrophobic colloidal silicic acid or alkali earth stearate and grinding it to a powder; or (b) admixing 1 part by weight of honey with 6 parts by weight of a hot saturated aqueous cyclodextrin solution, freezing the homogeneous solution thus obtained, subjecting the product to lyphilization, adding 0.01–1.0% by weight of hydrophobic colloidal silicic acid or alkali earth stearate to the lyophilized product and grinding it to a powder.

The advantage of the invention is that the aroma substances of honey are preserved and set free only during consumption.

5 Claims, No Drawings

HONEY POWDER PRESERVING ITS NATURAL AROMA COMPONENTS

This invention relates to honey powder preserving its natural aroma substances and to a process for the preparation thereof.

The industrial scale application of honey is rendered difficult by the high viscosity of honey. This makes the feeding of automatic production lines complicated and also causes losses of at least 5% when discharging the container.

Several methods are known for the elimination of the difficulties caused by the high viscosity of honey.

The said known procedures can be divided into three groups. According to the first method honey is solidified into blocks by crystallizing the components which are able to crystallize (U.S. Pat. No. 2,021,450). In this case evaporation in vacuum is carried out, if necessary. According to the second method milk, milk powder or butter is admixed with the honey to yield a product which can be consumed either directly or after diluting with water (British Pat. No. 318,388, U.S. Pat. No. 1,854,430 or GFR Pat. No. 848.448). By the third method the honey delivers the amount of water required for the pasting of starch (or the starch content of flour) used for the solidification of honey (U.S. Pat. Nos. 2,693,420, 3,103,439 and 3,879,567). The majority of the flavour and aroma substances of the products thus obtained is, however, already lost during the thermal treatment carried out on pasting and drying. Further losses occur during baking and for this reason in the ready-for-use bakery product only the sugar content of honey is retained.

It is known that cyclodextrins are capable of binding aroma substances in their internal apolar cavities. According to Hungarian Pat. No. 174,699 a concentrated warm aqueous solution of cyclodextrin is admixed with the aroma substance or—preferably with an ethanolic solution thereof, the mixture is cooled and the inclusion complex of the aroma substance formed with cyclodextrin is crystallized. This product can be stored in air for an unlimited period of time and it preserves the aroma substance contained therein. The binding of meat and vegetable aroma substances is disclosed in U.S. Pat. No. 3,061,444.

When carrying out the known aroma binding procedure with cyclodextrin it is essential that the components (i.e. the cyclodextrin and aroma substance) should be reacted in concentrated aqueous or aqueous-alcoholic solution. It is known that complex formation is reversible and therefore the equilibrium state can be shifted in favor of complex formation by increasing the concentration of the components. It is evident from the above condition that the process can not be realized by using diluted aqueous solutions.

Hitherto there is not known any process which would preserve the aroma components of honey until consumption when they should desirably be set free only during chewing.

It is the object of the present invention to provide a solid honey composition in powder form which is not hygroscopic and is capable of preserving the aroma substances of honey until consumption.

It has been found in a surprising manner that a honey composition in powder form meeting all the above requirements can be prepared by (a) kneading 1 part by weight of honey, 0.8 parts by weight of starch, pre-hydrolysed starch or flour and 0.1–0.3 part by weight of cyclodextrin to yield a homogeneous mixture, subjecting the mixture thus obtained to thermal treatment at 100° C. for 20 minutes, disintegrating the hot product obtained after thermal treatment, drying the product at a temperature of 50°–55° C. for 10–50 hours, adding 0.01–1.0% by weight of hydrophobic colloidal silicic acid or alkali earth stearate and grinding it to a powder; or (b) admixing 1 part by weight of honey with 6 parts by weight of a hot saturated aqueous cyclodextrin solution, freezing the homogeneous solution thus obtained, subjecting the product to lyophilization, adding 0.01–1.0% by weight of hydrophobic colloidal silicic acid or alkali earth stearate to the lyophilized product and grinding it to a powder.

The honey powder prepared by the process of the present invention can be stored in the air without the risk of sticking together and it delivers the aroma components only when consuming the bakery product prepared thereby.

The composition of the product depends on the starting materials used and may be as follows:

30–70% by weight—preferably 40% by weight—of dehydrated honey; 0–60 parts by weight—preferably 50% by weight of starch, pre-hydrolyzed starch, or flour;

6–60% by weith—preferably 10% by weight—of cyclodextrin; 0.01–5.0% by weight of flowability increasing agent, preferably hydrophobic silicic acid or alkali earth stearate;

the original aroma components of honey in the form of an inclusion complex formed with cyclodextrin.

The latter component can not be quantitatively defined as an exact numerical value because the aroma content of the composition depends to a very large extent on the honey used as starting material.

The term "dehydrated honey" relates to a product obtained from honey by removing the volatile components thereof (water).

EXAMPLE 1

50 g of honey (moisture content 18%), 40 g of maize starch and 10 g of $\beta$-cyclodextrin are homogenized and intensively kneaded for 30–40 minutes. The mass thus obtained is dried at 100° C. for 20 minutes. During this time the mass which contains the starch swells. After drying the warm mass is immediately ground to a crumbly state. The product is subjected to further drying at 50°–55° C.; the period of drying depends on the moisture content and is 10–30 hours. The dry product is immediately admixed with 0.5% of hydrophobic colloid silicic acid (e.g. Aerosil-900) and disintegrated in a knife grinder. The ground product is sieved and the fraction having a particle size smaller than 500 $\mu$m is separated. Yield 83.2 g.

The moisture take-up of the honey powder thus obtained is determined by the following method:

2 g of honey powder are spread (thickness about 1 mm) and allowed to stand at room temperature. The moisture content is weighed daily and plotted against time.

|  | time (days) | | | | | | | |
| --- | --- | --- | --- | --- | --- | --- | --- | --- |
|  | 1 | 2 | 5 | 6 | 7 | 8 | 9 | 14 |
| Honey powder + 0.5% | 2.1 | 3.3 | 4.9 | 5.7 | 5.4 | 5.0 | 4.4 | 4.2 |

-continued

| | time (days) | | | | | | | |
|---|---|---|---|---|---|---|---|---|
| | 1 | 2 | 5 | 6 | 7 | 8 | 9 | 14 |
| Aerosil-900 | | | | | | | | |

The honey powder which contains 0.5% of Aerosil-900 preserves its free-flowing powder consistency for at least months.

As control, a mixture of 50% of honey and 50% of maize starch—i.e. a composition containing no $\beta$-cyclodextrin—is prepared by the above process. According to gustatory analysis 84% of the members of the non-professional panel classified the sample containing cyclodextrin to have a higher aroma content than the sample without $\beta$-cyclodextrin.

In order to support the results of gustatory analysis by instrumental analytical measurements the aroma-stabilizing effect of the formation of the $\beta$-cyclodextrin inclusion complex is determined by computerized gas chromatography.

50 g of honey powder containing 50% of honey (with cyclodextrin or control respectively) and 50 g of a 1:1 mixture of honey and maize starch prepared without thermal treatment are stirred in 500 ml of distilled water for 5 minutes. 100 mg of $\alpha$-amylase of bacterial origin are added and the mixture is stirred for another 5 minutes at ambient temperature. The temperature of the solution is gradually raised to the boiling point within 30 minutes and steam distillation is carried out. In the receiver cooled with dry ice 200 ml of a fraction are collected within 90 minutes. The fraction is extracted with 5 ml of dichloro methane, the organic phase is separated and subjected to gas chromatography.

If the aromatic component content of honey not subjected to thermal treatment is taken as 100%, according to gas chromatography the aromatic substance content of honey powder containing 10% of $\beta$-cyclodextrin amounts to 107% and that of control samples containing no $\beta$-cyclodextrin to 51%.

EXAMPLE 2

One proceeds according to Example 1 except that maize starch is replaced by an identical amount of potato starch and drying is carried out in a vacuum exsiccator at room temperature for 24–48 hours. As additive 1% of magnesium stearate is added to increase the flowability of the powder. Weight: 82.7 g.

EXAMPLE 3

One proceeds according to Example 1 except that maize starch is replaced by an identical amount of household flour. The weight of the product amounts to 80.1 g.

EXAMPLE 4

One proceeds according to Example 1 except that maize starch is replaced by an identical amount of partially prehydrolyzed, readily soluble starch (SHP Schwach Hydrolysiertes Produkt; manufacturer: Company Küritz, German Democratic Republic. The kneaded product is dried on the cylinder of a steam heated drying drum. The weight of the product amounts to 81.4 g.

EXAMPLE 5

One proceeds according to Example 1 except that kneading and drying are carried out while varying the amount of $\beta$-cyclodextrin between 0% and 10%. According to gustatory analysis the members of the panel described in Example 1 classify the products containing 0%, 6% and 10% of $\beta$-cyclodextrin, respectively. 92% of the members of the panel classify the sample containing 10% of $\beta$-cyclodextrin to be of the highest quality. Half of the members of the panel classify the samples containing 0% and 6% of $\beta$-cyclodextrin, respectively in the correct and half in the wrong order of succession.

EXAMPLE 6

50 g of $\beta$-cyclodextrin are dissolved in 100 ml of boiling water. After dissolving 25 g of honey (water content 18%) are added to the hot solution. After complete admixture of the components the mixture is stirred for 5 minutes and thereafter lyophilized. To the dry product immediately 0.5% of hydrophobic colloidal silicic acid is added. The weight of the product amounts to 69.9.

EXAMPLE 7

5 g of honey (water content 18%) 4 g of maize starch and 1 g of $\alpha$-cyclodextrin are homogenized in a pug mill. The mixture is worked up as described in Example 1. The product weight is 8.2 g.

EXAMPLE 8

5 g of honey (water content 18%), 4 g of maize starch and 1 g of -cyclodextrin are homogenized in a pug mill. The mixture is worked up according to Example 1. The product weight is 8.3 g.

What we claim is:

1. A process for the preparation of honey powder while preserving its natural aroma substances, comprising:
   (a) kneading 1 part by weight of honey, 0.8 part by weight of starch, pre-hydrolyzed starch or flour, and 0.1–0.3 part by weight of cyclodextrin to yield a homogeneous mixture, subjecting the mixture thus obtained to thermal treatment at 100° C. for 20 minutes, disintegrating the hot product obtained after thermal treatment, drying the product at a temperature of 50°–55° C. for 10–50 hours, adding 0.01–1.0% by weight of hydrophobic colloidal silicic acid or alkali earth stearate and grinding it to a powder; or
   (b) admixing 1 part by weight of honey with 6 parts by weight of a hot saturated aqueous cyclodextrin solution, freezing the homogeneous solution thus obtained, subjecting the product to lyophilization, adding 0.01–1.0% by weight of hydrophobic colloidal silicic acicd or alkali earth stearate to the lyophilized product, and grinding it to a powder.

2. The process according to claim 1 wherein the cyclodextrin is $\alpha$-cyclodextrin.

3. The process according to claim 1 wherein the cyclodextrin is $\beta$-cyclodextrin.

4. The process according to claim 1 wherein the cyclodextrin is $\gamma$-cyclodextrin.

5. A solid, starch-containing honey composition suitable for use in the food industry which comprises 30–70% of dehydrated honey, 0–60% of starch, prehydrolyzed starch or flour, 1–60% of cyclodextrin and 0.01–5.0% of a flowability increasing agent preserving the original aroma components of honey in the form of a cyclodextrin inclusion complex.

* * * * *